Tétra-amines　　　　　　　　　　　　　　Hétérocycles 1,2,3,4 pyrazino [2,3-g] quinoxaline diones 2,3,6,7 ⟶ quinoxalino [6,7-g] quinoxaline diones 1,2,5,6 ⟶ quinoxalino [5,6-h] quinoxaline diones 1,4,5,8 ⟶ naphto [1,8-ef : 4,5-e'f']bis-diazépin-1,4-ones 2,3,5,6 ⟶ pyrazino [2,3 : 5,6] pyrido[2,3-b]

pyrazine diones 2,3,5,6 ⟶ dipyrazino [2,3-b : 2',3'-e] pyrazine diones

Tétra amines　　　　　　　　　　　　　　Hétérocycles 3,3′,4,4′ ⎯⎯⎯⎯⎯→ bis-quinoxalinon-2 yl-x,x′

3,3′,4,4′ ⎯⎯⎯⎯⎯→ bis-quinoxalinones 2 reliées par un enchaînement X

United States Patent Office 3,635,892
Patented Jan. 18, 1972

3,635,892
THERMOSTABLE HETEROCYCLIC POLYMERS CONSISTING OF POLY 2-QUINOXALINONES AND SIMILAR CYCLIC COMPOUNDS AND THEIR PROCESS OF MANUFACTURE
Guy Rabilloud, Bernard Sillion, and Gabriel de Gaudemaris, Grenoble, France, assignors to Institut Francais du Petrole, des Carburants et Lubrifiants, Rueil-Malmaison, Hauts-de-Seine, France
Filed Sept. 24, 1969, Ser. No. 860,498
Claims priority, application France, Sept. 25, 1968, 167,608
Int. Cl. C08g 33/02
U.S. Cl. 260—47 CP       18 Claims

ABSTRACT OF THE DISCLOSURE

There are provided thermostable heterocyclic polymers consisting essentially of recurring units of the formula

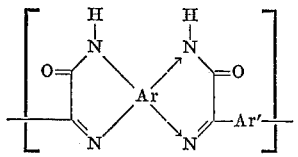

Figure 1:
Figure 1:
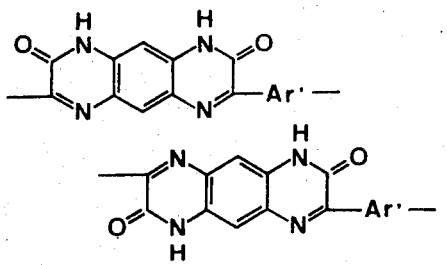

wherein Ar and Ar' are aromatic radicals of 4–40 carbon atoms. The polymers are produced by reacting an aromatic tetra-amine with an arylene-diglyoxylic compound of the formula $$RO_2\text{—CO—Ar'—CO—CO}_2R$$

wherein R is hydrogen, alkyl or aryl and said polymers are useful in the preparation of adhesive, sponges, cellular structures, molded materials and composite materials

---

This invention relates to new thermostable heterocyclic polymers, their process of manufacture and the preparation of compositions for use in the manufacture of adhesives, sponges, cellular structures, moulded or fritted materials, composite materials etc.

The new polymers according to the invention can be prepared by reacting at least one aromatic tetraamine with at least one bisglyoxylic arylene compound. The resulting polymers comply with the following general formula:

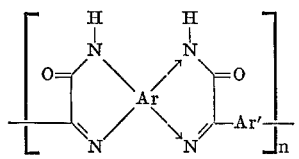

wherein the arrows indicate an isomery (in any recurring unit the groups towards which the arrows are directed may be present either in the shown position or in the reverse position), Ar is a tetravalent aromatic radical, Ar' is a divalent aromatic radical and $n$ is an integer representative of the degree of polycondensation.

The tetraamines as used conform with the formula herebelow:

wherein Ar is a homocyclic or heterocyclic tetravalent aromatic radical formed of a single ring such as those of benzene, pyridine, pyrazine, thiophene etc. of fused rings such as those of naphthalene, anthracene, phenanthrene, fluorene, perylene, quinoline, quinoxaline, phenazine etc. or of single or fused rings interlinked through a single bond or through one of the following linking groups designated by the reference X in the formulae representing reactions or products.

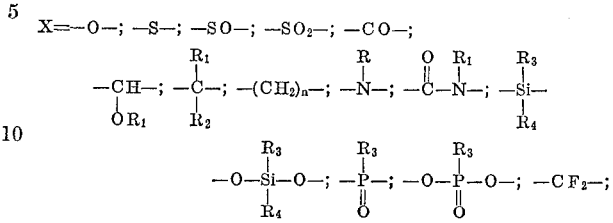

wherein $R_1$ and $R_2$ are hydrogen atoms, alkyl or aryl groups containing 1 to 40 carbon atoms, $R_3$ and $R_4$ being alkyl or aryl groups containing 1 to 40 carbon atoms.

The radical Ar preferably contains 4 to 40 carbon atoms.

In these tetra-amines, each amino group is directly linked to a separate carbon atom of the aromatic radical, the amino groups being present by pairs, the groups of each pair being adjacent to each other, i.e. in ortho or peri position.

The preferred tetra-amines are those in which the nitrogen atoms of each pair of amino groups are directly linked to carbon atoms in ortho position in radical Ar.

As examples of convenient tetraamines within the scope of the invention, are to be mentioned:

1,2,4,5-tetra-amino-benzene,
2,3,6,7-tetra-amino-naphthalene,
1,4,5,8-tetra-amino-naphthalene,
2,3,5,6-tetra-amino pyridine,
2,3,5,6-tetra-amino-pyrazine,
3,3'-diamino-benzidine,
3,3',4,4'-tetra-amino diphenyl ether,
3,3',4,4'-tetra-amino-diphenyl methane,
3,3',4,4'-tetra-amino-diphenylsulfone,
3,3',4,4'-tetra-amino-benzophenone,
3,3',4,4'-tetra-amino-benzhydrol,
3,3',4,4'-tetra-amino-benzanilide,
3,3',4,4'-tetra-amino-diphenyl dimethylsilane.

The arylene-bis-glyoxylic compounds as used, conform with the following formula:

$$RO_2C\text{—CO—Ar'—CO—CO}_2R$$

wherein R represents a hydrogen atom, an alkyl or an aryl group, Ar' is a homocyclic or heterocyclic divalent aromatic radical formed of a single ring, fused rings or single or fused rings interlinked through a linking group X as hereabove defined with respect to radicals Ar.

Ar' preferably contains 4 to 40 carbon atoms.

The arylene-diglyoxylic compounds may be prepared according to known methods, either by oxidation of arylenediacetic acids or esters, or by oxidation of dihalogenoacetyl aromatic compounds, particularly the dibromo acetyl compounds. When the latter are oxidized by means of selenium dioxide with the use of solvent of an anhydrous aliphatic alcohol, there is obtained directly the corresponding alkyl arylene-di-glyoxylate.

As examples of arylene diglyoxylic compounds which can be used according to this invention, are to be mentioned the alkyl or aryl acids or esters derived from the m-phenylene diglyoxylic acid, the p-phenylene diglyoxylic acid, the 2,2'-diphenyldiglyoxylic acid, the 4,4'-diphenyl-diglyoxylic acid, the 4,4'-diphenylether diglyoxylic acid, the 4,4'-diphenylmethane diglyoxylic acid, the 4,4'-diphenylsulfone diglyoxylic acid, the 1,5 - naphthalene diglyoxylic acid, the 9,10-phenanthrene diglyoxylic acid, the 3,9-perylene diglyoxylic acid, the 4,4'-benzophenone diglyoxylic acid, and the 4,4'-diphenylsulfide diglyoxylic acid.

Figure 2:
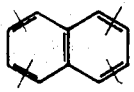
Figure 2:
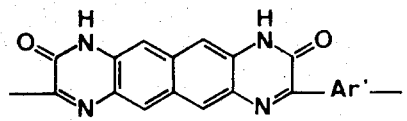
Figure 2:
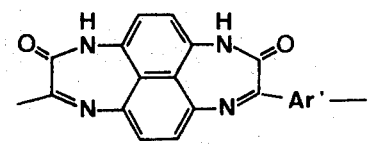
Figure 3:
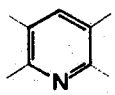
Figure 3:
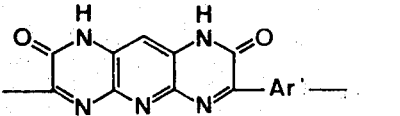
Figure 4:
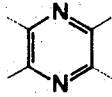
Figure 4:
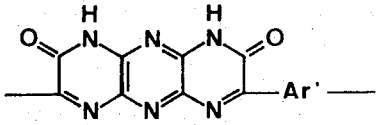
Figure 5:
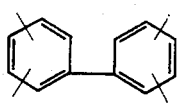
Figure 5:
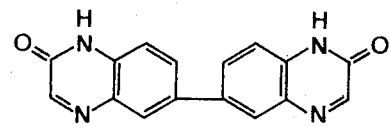
Figure 6:
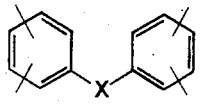
Figure 6:
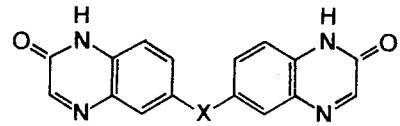

According to the type of tetra-amines used the polymers are formed of quinoxalinones or related heterocycles recurring units. Some of these heterocycles are shown on sheets I and II of the accompanying drawings. For example when Ar is benzene (FIG. 1), the condensation reaction gives [2,3-g] pyrazinoquinoxaline diones; when Ar is naphthalene (FIG. 2) there are obtained, according to the position of the amine groups, [6,7-g] quinoxalino-quinoxalinediones, [5,6-g] quinoxalinoquinoxalinediones or [1,8-ef:4,5-e'f'] naphto-bis [1,4 diazepinones]; when Ar is pyridine (FIG. 3) there are obtained [2,3:5.6] pyrazino [2,3-b] pyridopyrazine diones; when Ar is pyrazine (FIG. 4) there is produced [2,3-b:2',3'-e] dipyrazino pyrazinediones, when Ar is biphenyl (FIG. 5), there are obtained quinoxalinones interlinked through a carbon-carbon bond whereas when Ar is formed of cycles interlinked through an X linkage (FIG. 6) there are produced quinoxalinones interlinked through the same X linkage.

The above list is not limitative and is given for illustration by a few examples of heterocyclic compounds which can be synthesized according to the invention.

Besides, whereas in FIG. 1 the possible isomers are shown, this has not been done in the other figures for sake of simplicity. Such isomers are easily deducible by applying to the FIGS. 2, 3, 4, 5 and 6 the reaction schemes of FIG. 1.

The polycondensation reaction may be effected by fusing the reactants or in the presence of a solvent which is inert with respect to the products involved. In this latter case there are generally obtained polymers of low molecular weight whose polycondensation can be further completed by means of a thermal treatment at high temperature. In view of the high controllability of this type of reaction there can be prepared a large number of different copolymers by varying the nature and proportion of the starting reactants.

The selection of the polycondensation conditions essentially depends on the desired properties in view of a determined type of use. To a smaller extent it also depends on the solubility of the polymers in the solvents which may be used. The following description is given for illustrating the results achieved by different methods of preparation of the new heterocyclic polymers according to the invention.

When the polymerization reaction is carried out in the absence of a solvent, there is intimately admixed amounts, preferably in equimolecular proportion, of aromatic tetra-amine and an aryl-diglyoxylic compound. The mixture is progressively heated up under inert atmosphere until the reaction medium is melted. According to the reactants involved, this melting occurs between 60 and 300° C. The temperature of the homogeneous mixture is brought to a value at which the reaction easily progresses (200–300° C.). The reaction is completed by heating the reaction mixture up to about 400° C. The treatment at 400° C. is preferably conducted under reduced pressure so as to facilitate the removal of distillable components of the reaction mixture while the cyclization is completed.

When operating in the presence of a solvent, it is possible either to dissolve one of the reactants into the solvent and add the second in a solid state as a whole or stepwise, or to separately dissolve the reactants into the same or different solvents and add the solutions together, or still to add the solvent to the mixture of the solid reactants or conversely to add the mixture of the solid reactants to the selected solvent.

The temperature at which the reaction occurs depends on the reactivity of the starting materials and on the desired characteristics of the polymer. Generally when the aryl-diglyoxylic derivative and the tetraamine are very reactive, the condensation takes place at the ambient temperature; when they are not very reactive, there is selected a solvent which can be brought to the temperature required for an easy reaction. The preferred solvents are those which are inert with respect to the polymers. There may be selected solvents which can dissolve only the starting products, wherein the polymers rapidly precipitate but there can be also selected solvents which can dissolve the polymers at least up to a certain degree of completion of the polycondensation. Amongst the solvents which can be used according to the invention are to be mentioned water, primary, secondary and tertiary branched or unbranched alcohols such as methanol, ethanol, isopropanol, tert-butyl alcohol, neopentyl alcohol, the aliphatic carboxylic acids such as acetic acid, aliphatic or aromatic ethers such as dibutyl ether or diphenyl ether, aliphatic or aromatic esters of aliphatic or aromatic carboxylic acids such as ethyl acetate, phenyl acetate, ethyl benzoate, the glycol mono or dialkyl ethers, the glycol aliphatic or aromatic mono- or diesters, the halogenated hydrocarbons such as chloroform, carbontetrachloride, tetrachloroethane, etc., the phenols such as phenol, m-cresol, chlorophenols etc. There can also be used pyridine, quinoline, dioxane, tetrahydrofuran, dimethyl-N,N formamide, dimethyl N,N acetamide, dimethylsulfoxide, N-methyl pyrrolidone, hexamethylphosphoramide, acetonitrile, nitrobenzene, etc.

According to the selected solvent, the precipitation of the polymers occurs after a shorter or longer reaction time at a given temperature. The polymers generally have a mean molecular weight, their inherent viscosity at 30° C. for a concentration of 0.5% by weight in dimethylsulfoxide being for instance between 0.02 and 0.3. When the polymers do not precipitate in the solvent, they can be separated by addition of a non-solvent which favours their precipitation, or by evaporation of the solvent up to dryness. In every case the polycondensation may be completed by a heating treatment at high temperature, preferably under reduced pressure. During this reaction there are formed heterocycles and there are obtained polymers which are infusible and insoluble in the usual solvents.

Another method consists of dissolving the reactants in polyphosphoric acid and heating the resulting solution up to a temperature higher than 50° C., preferably between 80 and 300° C. until the polymer attains the desired molecular weight. It is then separated by usual separation methods. It is possible in such a method to make use of free tetra-amines but is preferred to use less oxidizable compounds particularly tetraamines whose functions are salified with strong mineral acids such as hydrochloric acid or sulfuric acid.

Most of the polymers according to the invention are infusible, insoluble and difficult to use in such form for any practical use. On the contrary it is easy to separate prepolymers whose softening temperature is lower than 400° C., which are soluble in certain organic solvents and therefore utilizable either as such or in solution. These prepolymeric compositions can be preserved or immediately used in view of a determined use. After shaping of the resinous composition it is preferred to convert the same, by means of a convenient thermal treatment, to heterocyclic polymers according to the invention. The final product of specific shape may be constituted of one or more heterocyclic polymers either alone or in admixture, or of a mixture of such polymers with other known polymers, or of such polymers as modified with the use of inert materials. According to their nature, the inert materials can be added before or after the shaping step. Besides their use in the manufacture of adhesives withstanding high temperatures, sponges or cellular structures, molded or fritted articles, the polymers according to the invention provide for remarkable results in the manufacture of composite materials. For preparing these materials the prepolymer composition is dissolved in a solvent and the resulting solution is used for coating the reinforcement material such as glass fabrics for instance. After evaporation of the solvent the impregnated elements are pressed against each other so as to obtain a stratified material which is subjected to a heat treatment under a sufficient pressure for causing the elements to adhere to one another.

The invention will be more fully described in the specific following examples given only for illustrative purposes and which are not intended to limit in any way the scope of this invention.

EXAMPLE 1

There are intimately admixed under inert atmosphere 1.6904 g. of p-phenylene ethyl diglyoxylate and 1.3017 g. of 3,3' diamino-benzidine in a flask of 25 ml. The flask is immersed into a metal alloy bath at 200° C. and subjected to the following thermal treatment 30 minutes at 200° C., temperature increase up to 350° C. with a progressivity of 1° C. per minute and temperature of 350° C. maintained for one hour. The resulting polymer is hardly soluble in N-methylpyrrolidone and dimethylsulfoxide. Its inherent viscosity in concentrated sulfuric acid is 0.6 at 30° C. for a 0.2% concentration. The polycondensation is completed by a thermal treatment for 1 hour at 400° C. under a vacuum of 0.01 mm. Hg. There is thus obtained an insoluble and infusible polymer whose elementary analysis and IR and UV spectra lead to identification of poly [1,4-phenylene (1H,2-quinoxalinon 3,6 diyl) 1H,2-quinoxalinon 6,3-diyl)] or its isomers or mixture of said polymer with its isomers.

The thermogravimetric analysis of this polymer, carried out with a thermobalance controlled for a temperature raise of 60° C. per hour shows that the decomposition threshold is at about 420° C. under argon atmosphere and 370° C. in air.

EXAMPLE 2

Under the same conditions the reaction of 1.5444 g. of p-phenylene ethyl diglyoxylate with 1.2780 of 3,3',4,4'-tetraaminodiphenyl ether gives poly [1,4-phenylene (1H,2-quinoxalinon 3,6-diyl) (oxy-1H,2-quinoxalinon 6,3-diyl)] or a mixture of this polymer with its isomers.

EXAMPLE 3

Under the same conditions the polycondensation of 1.3161 g. of biphenyl 4,4'-ethyl diglyoxylate and 0.8000 g. of 3,3'-diaminebenzidine yields poly [4,4' - biphenylene (1H,2-quinoxalinon 3,6-diyl) (1H,2-quinoxalinon 6,3-diyl)] and its isomers.

EXAMPLE 4

1.8518 g. of diphenylether 4,4'-ethyldiglyoxylate and 1.1513 g. of 3,3',4,4'-tetraaminodiphenylether treated for 1 hour at 200° C., 1 hour at 250° C. and 1 hour at 300° C. give a polymer having an inherent viscosity equal to 0.88 as measured at 30° C. for a 0.5% concentration in m-cresol. After treatment at 350 and 400° C. under a vacuum of 0.01 mm. Hg, the polymer becomes infusible and insoluble. The analysis of this product shows a structure corresponding to poly-[1,4 phenylene 1,4 oxyphenylene (1H,2-quinoxalinon 3,6 diyl) (oxy-1H,2-quinoxalinon 6,3 diyl)] or a mixture of said polymer with its different isomers.

As specific examples of other polymers which can be prepared according to the general and specific methods hereabove described are those complying with the general formula:

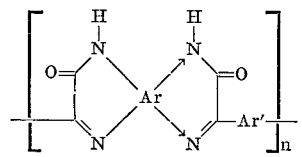

wherein the radicals Ar and Ar' are derivatives of the following hydrocarbons or heterocyclic compounds (the positions of substitution of Ar with vicinal atoms or radicals —N═ and —NH—, as well as the positions of substitution of Ar' with the carbon atoms of the heterocyclic rings are given into brackets.

| Example No. | Ar' | Ar |
| --- | --- | --- |
| 5 | (1,4) benzene | (3,3',4,4') diphenylmethane |
| 6 | (1,4) benezene | (3,3'4,4') benzophenone |
| 7 | (1,4) benezene | (3,3'4,4') benzanilide |
| 8 | (1,4) benzene | (2,3,5,6) pyridine |
| 9 | (1,4) benzene | (2,3,5,6) pyrazine |
| 10 | (1,4) benzene | (1,4,5,8) naphthalene |
| 11 | (1,3) benzene | (1,2,4,5) benzene |
| 12 | (1,3) benzene | (3,3'4,4') biphenyl |
| 13 | (1,3) benzene | (3,3',4,4') diphenylether |
| 14 | (1,3) benzene | (3,3',4,4') diphenylmethane |
| 15 | (1,3) benzene | (3,3'4,4') benzophenone |
| 16 | (1,3) benzene | (3,3'4,4') benzhydrol |
| 17 | (4,4') diphenylether | (1,2,4,5) benzene |
| 18 | (4,4') diphenylether | (3,3',4,4') diphenylmethane |
| 19 | (4,4') diphenylether | (3,3',4,4') benzophenone |
| 20 | (4,4') diphenylether | (3,3'4,4') benzhydrol |
| 21 | (4,4') diphenylether | (3,3'4,4') biphenyl |
| 22 | (4,4') benzophenone | (3,3'4,4') biphenyl |
| 23 | (4,4') benzophenone | (3,3',4,4') diphenylether |
| 24 | (4,4') benzophenone | (3,3',4,4') diphenylmethane |
| 25 | (4,4') benzophenone | (3,3',4,4') benzophenone |
| 26 | (4,4') benzophenone | (3,3'4,4') benzhydrol |
| 27 | (1,5) naphthalene | (2,3,6,7) naphthalene |
| 28 | (4,4') diphenylsulfone | (3,3'4,4') diphenylsulfone |
| 29 | (4,4') diphenyl | (1,2,4,5) benzene |
| 30 | (4,4') diphenyl | (3,3'4,4') diphenylether |
| 31 | (4,4') dimethldiphenylsilane | (3,3',4,4') dimethyldiphenylsilane |

EXAMPLE 32

Under inert atmosphere 1.2254 g. of 3,3'-diaminobenzidine are dissolved in 10 ml. of m-cresol and to the resulting solution, under vigorous stirring, are added 1.5914 g. of p-phenylene ethyl diglyoxylate dissolved in 10 ml. of the same solvent. The mixture is heated up to 120° C. for 3 hours. After cooling the mixture is diluted with methanol and there is separated a prepolymer which is dried at 110° C. under vacuum. This prepolymer exhibits an inherent viscosity of 0.085 as measured at 30° C. for a 0.5% concentration in dimethylsulfoxide. By furthering the polycondensation in the solid phase, first in an inert atmosphere and thereafter under vacuum, up to 400° C., there is obtained the same polymer as in Example 1.

EXAMPLE 33

Under inert atmosphere, a solution of 2.9527 g. of m-phenylene ethyl diglyoxylate in 30 ml. of anhydrous dioxane is added to 2.2737 g. of 3,3' diamino benzidine, dissolved in 30 ml. of the same solvent. The mixture is heated to reflux for 5 hours and, after distillation of a portion of the dioxane, the prepolymer, which precipitates, is separated by filtration, washed with methanol and ether and dried under vacuum. The inherent viscosity is 0.09 as measured at 30° C. for a 0.5% concentration in dimethylsulfoxide. The polycondensation is completed by a thermal treatment under vacuum up to 400° C. The resulting polymer corresponds to the poly-[1,3 phenylene (1H,2-quinoxalinon 3,6-diyl) (1H,2-quinoxalinon 6,3- diyl)] or an isomer thereof or a mixture of said polymer with one or more isomers thereof.

EXAMPLE 34

Into a flask of 250 ml. with three necks provided with a stirrer, a feeding funnel for solids, an inlet and an outlet for inert gas, there are introduced 100 g. of polyphosphoric acid at 116% and the same is stirred under inert atmosphere for 3 hours at 150° C. After cooling down to 40–50° C. there are added 1.8806 g. of 3,3′,4,4′-tetra-amino diphenylether tetrachlorhydrate. The solution is heated to 150° C. until hydrochloric acid no longer evolves. It is then cooled down to 50° C. before having added thereto 1.8518 g. of diphenyl ether 4,4′ ethyl diglyoxylate. The mixture is heated at 150° C. for 5 hours and 200° C. for 24 hours and then cooled down to 100° C. and poured into 600 ml. of water. The polymer, which precipitates, is washed during one night with a 10% ammonium carbonate solution, then extracted with boiling water in a Soxhlet for 72 hrs. It is filtrated and dried under vacuum at 200° C. The resulting polymer is identical to that obtained according to Example 4.

EXAMPLE 35

Under an inert atmosphere are admixed a solution of 5.1152 g. of diphenylether 4,4′ ethyl diglyoxylate in 60 ml. of dioxane and a solution of 3.1804 g. of 3,3′-tetra-amino 4,4′ diphenyl ether in 60 ml. of dioxane. The mixture is brought to reflux for 6 hours and the solvent is then evaporated under reduced pressure to dryness. The resulting prepolymer exhibits an inherent viscosity of 0.11 as measured at 30° C. for a 0.5% concentration in N-methylpyrrolidone, a softening temperature of 230° C. and a melting point of about 300° C.

The prepolymer, dissolved in 10 ml. of N-methylpyrrolidone, is used for coating a glass fabric E, armor 181, without finish so that, after evaporation the ratio resin/glass be between 35 and 50% by weight.

The impregnated fabric is cut in eight identical pieces which are superimposed and placed between the plates of a hydraulic press. There is prepared a composite material by subjecting these pieces to a pressure of 15 kg./cm.$^2$ for 1 minute at 300° C., 3 hours at 370° C. and 30 minutes at 400° C. The samples cut from this material are tested by means of the Instron machine, equipped for the measurement of the breaking stress under flexion. The obtained values are 50 kg./mm.$^2$ at 25° C., 45 kg./mm.$^2$ at 300° C. and 38 kg./mm.$^2$ at 350° C.

EXAMPLE 36

There are admixed equimolecular amounts of diphenyl-ether 4,4′-ethyl diglyoxylate and 3,3′,4,4′-tetra-amino diphenyl ether under argon atmosphere. This mixture is immersed in a bath at 150° C. for 1 hour and at 200° C. for 10 minutes. The prepolymer is then crushed and dissolved in N-methylpyrrolidone and thereafter used for impregnating a glass fabric and treated as in Example 35. The samples, taken by cutting the stratified material exhibit a breaking stress under flexion of 52 kg./mm.$^2$ at 25° C., 48 kg./mm.$^2$ at 300° C. and 45 kg./mm.$^2$ after ageing at 300° C. in air for 100 hours.

What we claim is:

1. A thermostable heterocyclic polymer consisting essentially of recurring units of the formula:

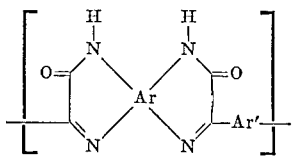

wherein Ar and Ar′ are homocyclic or heterocyclic aromatic radicals containing 4 to 40 carbon atoms, each consisting of a single ring, fused rings, or a plurality of single rings or a plurality of fused rings interconnected by a single bond or a linking group selected from:

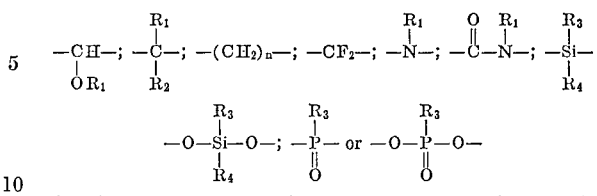

wherein $R_1$ and $R_2$ are hydrogen atoms, or lower alkyl groups $R_3$ and $R_4$ being lower alkyl groups; said polymer having an inherent viscosity of at least about 0.02, measured as a 0.5% by weight solution in dimethylsulfoxide at 30° C.

2. A polymer according to claim 1 wherein

Ar is selected from the group consisting of: benzene, naphthalene, biphenyl, diphenylmethane, benzophenone, benzhydrol, benzanilide, benzidine, diphenylether, diphenylsulfone, diphenyldimethylsilane, pyridine, and pyrazine, and Ar′ is selected from the group consisting of: benzene, naphthalene, phenanthrene, perylene, biphenyl, diphenylmethane, diphenylether, diphenylsulfone, diphenylsulfide, and diphenyldimethylsilane.

3. A process for preparing polymers according to claim 1 comprising reacting at ambient to about 400° C. an aromatic tetra-amine of the formula:

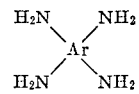

with an arylene-diglyoxylic compound of the formula:

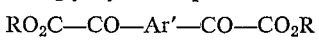

wherein Ar and Ar′ are aromatic radicals such as defined in claim 1, and R is a hydrogen atom, an alkyl radical or an aryl radical.

4. A process according to claim 3, wherein the monomers are reacted in a melted state.

5. A process according to claim 3 wherein the monomers are reacted in an inert solvent.

6. A process according to claim 3 wherein the reaction takes place in a polyphosphoric acid solution.

7. A process according to claim 3 wherein the polycondensation reaction with the monomers in melted or dissolved state is stopped at a moment when the resulting products are still fusible.

8. A polymer as defined by claim 1 having a degree of polycondensation such that the polymer is fusible.

9. A polymer as defined by claim 1, said inherent viscosity being about 0.02–0.3.

10. A polymer as defined by claim 1 wherein said lower alkyl group is methyl.

11. A polymer as defined by claim 1 wherein Ar is selected from the group consisting of biphenyl and diphenyl ether and Ar′ is selected from the group consisting of p-phenylene, m-phenylene and diphenyl ether.

12. A polymer as defined by claim 1, said polymer being poly [1,4-phenylene (1H,2-quinoxalinon 3,6-diyl) (1H,2-quinoxalinon 6,3-diyl)].

13. A polymer as defined by claim 1, said polymer being poly [1,4 phenylene (1H,2-quinoxalinon 3,6-diyl) (oxy-1H,2-quinoxalinon 6,3-diyl)].

14. A polymer as defined by claim 1, said polymer being poly [1,4 phenylene 1,4 oxyphenylene(1H,2-quinoxalinon 3,6 diyl) (oxy 1H,2-quinoxalinon 6,3 diyl)].

15. A polymer as defined by claim 1 wherein Ar′ is (1,3) divalent benzene and Ar is (3,3′,4,4′) tetravalent biphenyl.

16. A polymer as defined by claim 1 wherein Ar′ is (1,3) divalent benzene and Ar is (3,3′,4,4′) tetravalent diphenyl ether.

17. A polymer as defined by claim 1 wherein Ar' is (4,4') diphenyl ether and Ar is (3,3',4,4') biphenyl.

18. A polymer as defined by claim 1, said polymer being poly [1,3 phenylene (1H,2-quinoxalinon 3,6-diyl (1H,2-quinoxalinon 6,3-diyl)].

References Cited

UNITED STATES PATENTS

| | | | |
|---|---|---|---|
| 3,408,326 | 10/1968 | Errede | 260—47 |
| 3,444,136 | 5/1969 | Belohlav et al. | 260—47 |
| 3,470,140 | 9/1969 | Salle et al. | 260—78 |

WILLIAM H. SHORT, Primary Examiner

L. L. LEE, Assistant Examiner

U.S. Cl. X.R.

117—123 D; 161—192; 260—30.2, 30.6 R, 32.4, 33.4 P, 63 R, 65, 78 TF, 250 R, 448.8 R, 473 A, 520, 521 R